United States Patent [19]

Kerman et al.

[11] 4,087,649

[45] May 2, 1978

[54] PULSE COUNTING CIRCUIT

[75] Inventors: Stephen E. Kerman, Merrick, N.Y.; Fumikazu Hamatani, Kawasaki; Fumio Tsutsumi, Takasaki, both of Japan

[73] Assignees: Nippon Tsu Shin Kogyo K.K., Kawasaki, Japan; TIE/Communications, Inc., Stamford, Conn.

[21] Appl. No.: 725,110

[22] Filed: Sep. 21, 1976

[51] Int. Cl.² .............................................. H04M 1/72
[52] U.S. Cl. .................................. 179/99; 179/16 H; 179/37
[58] Field of Search ............... 179/16 H, 18 AD, 37, 179/84 SS, 99, 16 G, 18 EB

[56] References Cited

U.S. PATENT DOCUMENTS

| | | | |
|---|---|---|---|
| 1,530,968 | 3/1925 | Williams, Jr. | 179/16 H |
| 3,243,515 | 3/1966 | Abbott | 179/16 H |
| 3,670,110 | 6/1972 | Warner | 179/18 AD |
| 3,885,109 | 5/1975 | Sudoh et al. | 179/99 |
| 4,009,354 | 2/1977 | Champan | 179/99 |

*Primary Examiner*—Kathleen H. Claffy
*Assistant Examiner*—Randall P. Myers
*Attorney, Agent, or Firm*—Kenyon & Kenyon

[57] ABSTRACT

A counting circuit is disclosed which generates an electrical representation corresponding to the number of pulses in a plurality of pulse trains, each pulse train containing at most ten pulses. The circuit does not start to count the number of pulses in individual pulse trains until a first pulse train with more than a preselected number of pulses is received. The circuit then counts each pulse in subsequently received pulse trains for a preselected number of pulse trains. The circuit is particularly useful in key telephone dial pulse signalling apparatus as a register circuit which is not responsive to false pulses generated by lifting the handset.

2 Claims, 29 Drawing Figures

PULSE COUNTING CIRCUIT

BACKGROUND OF THE INVENTION

1. Field of the Invention

This invention relates to electrical counter circuits. In particular the invention relates to counter circuits for counting dial pulses generated by a dial pulse relay apparatus associated with a key telephone station set.

2. Description of the Prior Art

In prior art key telephone apparatus, malfunctions in counter circuits used in signalling apparatus have occurred when an erroneous pulse or pulses, similar to a dial pulse, enters the counting circuit. Erroneous pulses can be generated when the handset is lifted from the telephone station for the purpose of placing an extension call over an intercom line. The erroneous pulses occur because of mechanical hookswitch bouncing or fumbling when the handset is lifted.

One approach in the prior art to solve this problem has been to attempt to make mechanical changes in the hookswitch construction in order to eliminate hookswitch bounce. This approach has not been very successful because of mechanical constraints in the design of the telephone set.

A general object of this invention is to provide a new and improved counter circuit for use in a key telephone system which ignores or absorbs erroneous pulses occurring as a result of hookswitch bounce.

A further object of this invention is to provide a new and improved counter circuit for use in signalling apparatus associated with a key telephone system.

Another object of this invention is to provide a counter circuit for use in a key telephone signalling system which disregards erroneous pulses generated by hookswitch bouncing or fumbling.

It is another object of this invention to provide a counter circuit which returns to its reset state if the count of the number of pulses in the first pulse train arriving at the counter circuit is less than a predetermined number $n$ of pulses where $1 < n < 7$.

SUMMARY OF THE INVENTION

This invention is a pulse counting apparatus, especially adapted for use in key telephone system signalling apparatus for counting the number of pulses in a plurality of sequentially applied pulse trains, for example the pulses generated by dial pulls associated with digits dialled on a telephone set. The apparatus is responsive to pulse trains having at most 10 pulses.

Resetting means are provided in the invention to reset the counting apparatus to zero count or a reset state if the first pulse train applied to the counting apparatus contains less than $n$ pulses where $n$ is a preselected integer from 2 to 6. A preferred embodiment of the invention, presented in the description of the invention which follows, is constructed so as to not be responsive to a single pulse first dial pulse train, or in other words where $n$ is less than 2.

The invention has a first counting means for counting the pulses in the first applied pulse train. Relay means are provided to count the pulses in the first pulse train and silicon controlled rectifiers are energized, a particular one being energized corresponding to the number of pulses in this first pulse train. The preferred embodiment described contains four silicon controlled rectifiers one of which is energized corresponding to whether 2, 3, 4 or 5 pulses are recited in the first pulse train.

A second counting means is established after the first pulse train has ended. The same relays used in the first counting means now count the pulses in the second pulse train applied. One or more relays are operated in a unique combination, each combination corresponding to a particular number of pulses in the counted pulse train. Output signals are applied on leads associated with the silicon controlled rectifier means for energizing a unique lead corresponding to the number of pulses in the first pulse train. The contacts of the relays in the second counting means are arranged so that a unique lead corresponding to the number of pulses in the second pulse train is energized.

BRIEF DESCRIPTION OF THE DRAWINGS

This invention, as well as its objects and features will be better understood by reference to the following detailed description of the preferred embodiment of this invention taken in conjunction with the accompanying drawings in which:

FIGS. 4-1 through 4-26 show internal electrical circuit paths for different states of the counter in accordance with this invention.

DESCRIPTION OF THE INVENTION

The invention pertains to a counter circuit which counts the pulses for a plurality of pulse trains, such as those which are generated when a dial of a telephone set is turned or "pulled". The counter is initially in a quiescent or "reset state". If a pulse train having fewer than $n$ pulses ($n$ being an integer in the range of $1 \leq n \leq 9$) is applied to the input of the counter, the counter resets itself to its quiescent state. Thus erroneous pulse inputs caused by hookswitch bouncing or fumbling, typically generating a small number of erroneous pulses, do not enter the counter and do not cause a malfunction when signalling begins.

The invention will be explained by reference to a particular counter circuit which does not start counting if the first dial pulse train contains only one pulse. The circuit is adapted to serve as a counter circuit in signalling apparatus for intercom lines in a key telephone system in which at most 40 stations are connected. The circuit thus is responsive to and records a count of the digits 2, 3, 4 and 5 for a first dial pull (tens-position digit) and the 10 digits 1-0 for a second dial pull (ones-position digit) yielding a selection of 40 different outputs. As indicated above if a 1 is dialed on the first dial pull, or a single erroneous pulse enters the counter, the circuit returns to zero state.

Figure 1:
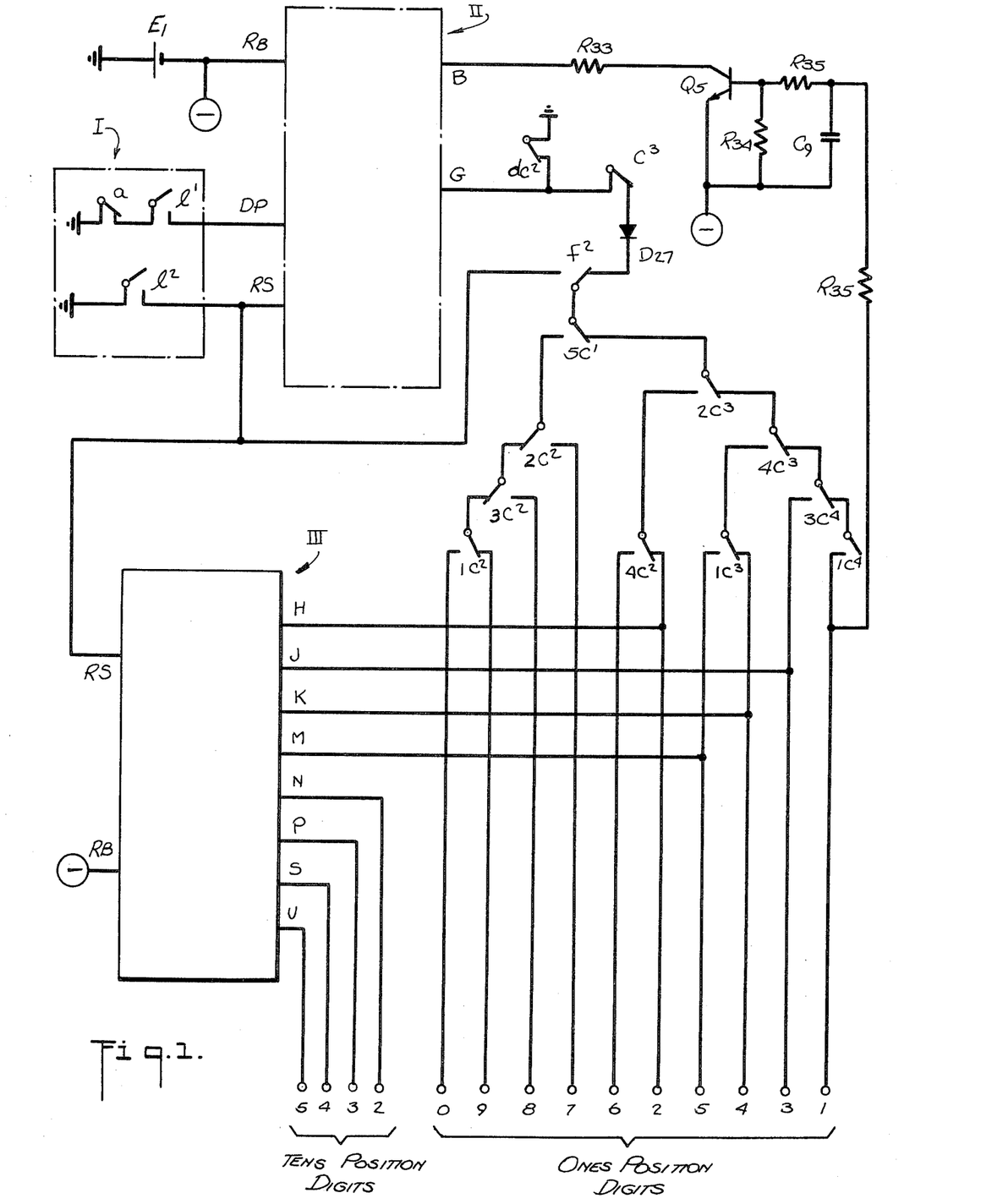
FIG. 1 shows an electrical schematic, with boxes labeled I, II and III of a counter circuit, constructed in accordance with this invention, for counting tens position digits and ones position digits while not counting a single pulse input to the counter as a tens-position digit.

In FIG. 1, the box indicated by "I" represents a pulse source controlled by a single extension telephone station, and grounded in common with the subject counter circuit. Contact $a$ is the contact of a pulse generating relay A not shown in the drawing. Relay A is controlled by a telephone set also not shown in the drawing.

It is operated when the telephone set goes "off hook". A dial pull of the telephone station set causes relay contact a to close for each pulse and generate a pulse train or sequence of pulses having a total number of pulses corresponding to the digit being dialed.

Contacts labeled $l^1$ and $l^2$ in box I of FIG. 1 represent the contact of a lock-out relay L not shown in the drawing. Relay L is energized and contacts $l^1$ and $l^2$ are closed by the operation of relay A. Relay L remains operated and is not sensitive to the release of a relay A during dial impulsing.

Figure 2:
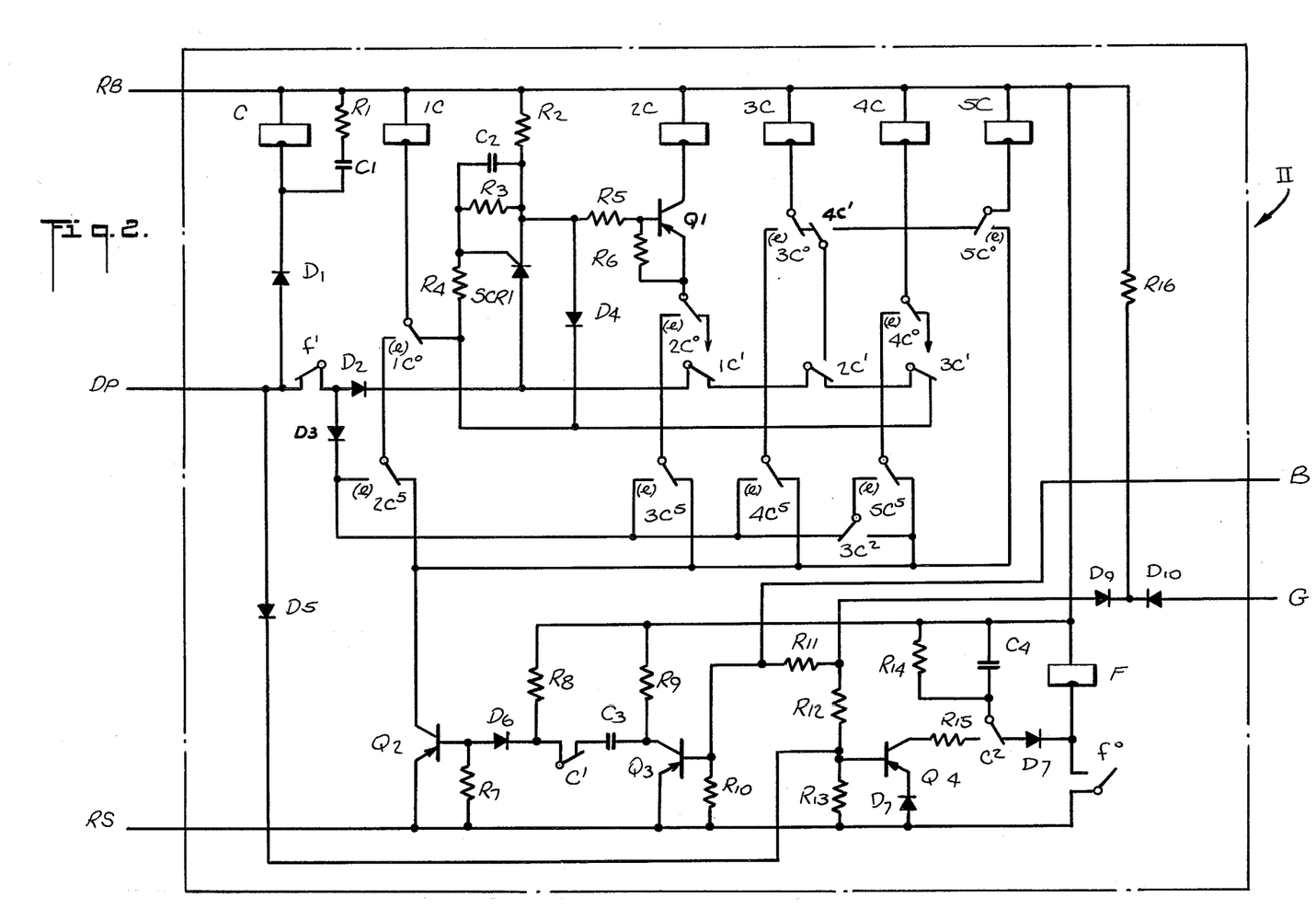
FIG. 2 shows an electrical schematic for the box labeled II as indicated in FIG. 1, constructed in accordance with this invention.

The box labeled "II" in FIG. 1 represents the circuit shown in FIG. 2. Small rectangles labeled "1C" to "5C" in FIG. 2 are the coils of counter relays, the contacts of which are labeled $1C^\circ$, $1C^1$....$5C^1$, $5C^5$etc. and are indicated in FIG. 1 and FIG. 2. Relay C in FIG. 2 is energized during the time when a dial pulse, transmitted by contact a, is being input. Contacts $C^3$ and $C^1$ are indicated in FIG. 1 and FIG. 2. Relay F in FIG. 2 is a counting completion relay, and contacts f in FIG. 1, FIG. 2 and FIG. 3 are its contacts.

Figure 3:
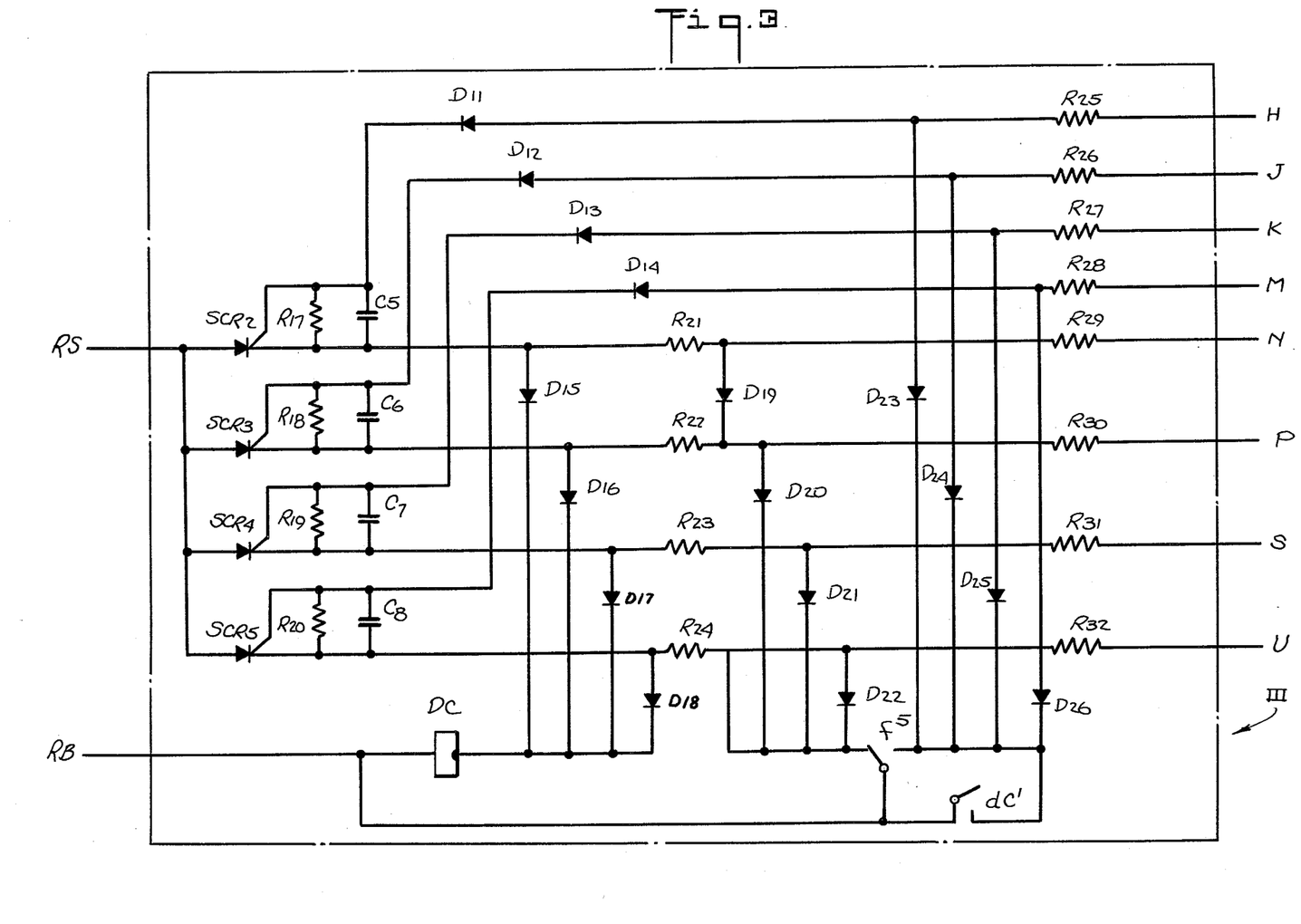
FIG. 3 shows an electrical schematic for the box labeled III as indicated in FIG. 1 constructed in accordance with this invention.

The box labeled "III" in FIG. 1 is a circuit shown in FIG. 3. Relay DC in FIG. 3 is a relay that operates after a first dial pull (tens-position digit) has been registered, and contacts labeled dc in FIG. 1 and FIG. 3 are its contacts. Also in FIG. 1, FIG. 2 and FIG. 3, R1 to R36 are resistors, C1 to C9 are capacitors, D1 to D27 are diodes, Q1 to Q4 are PNP transistors, Q5 is a NPN transistor, and SCR1 to SCR5 are silicon controlled rectifiers. SCR1 (FIG. 2) is an element for activating a digit counting circuit used at the beginning of each pulse train and SCR2 to SCR5 are used for recording tens-position digits in that counting circuit (FIG. 3). A d.c. voltage source is labeled "E".

Circuit resetting: one pulse present in the first pulse train

The discussion which follows explains the counter reset function of the invention for the case when an erroneous pulse (a one pulse train) is received by the counter in its quiescent or reset state. The possible generation of an erroneous pulse occurs when the key telephone set user raises the handset in order to make an intercom call to another key telephone set in the system. Relay A goes through an operate-release-operate sequence because of the bouncing of the hookswitch, and one pulse is applied to the input of the counting circuit.

Figure 41:
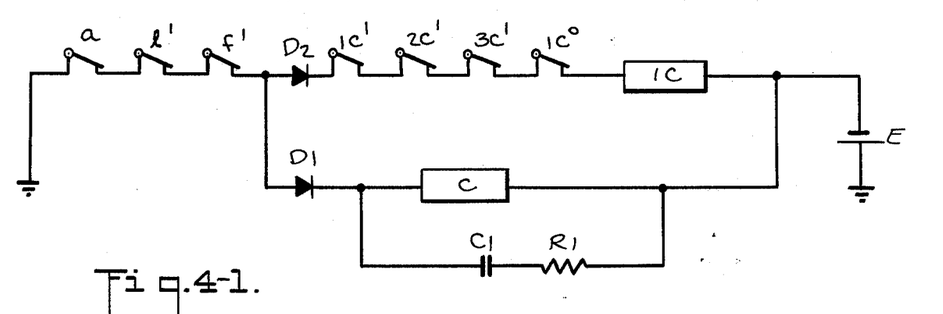
Figure 42:
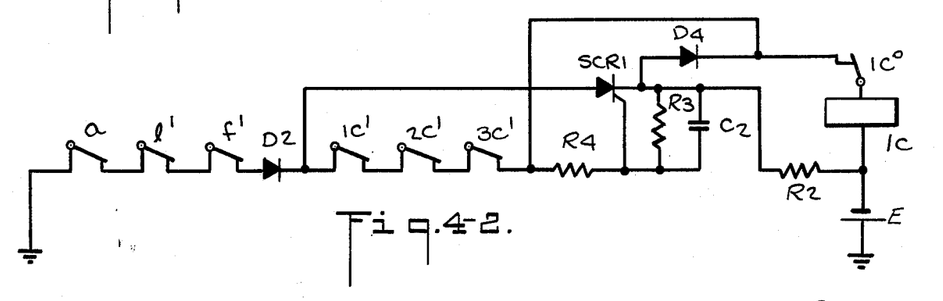
Figure 43:
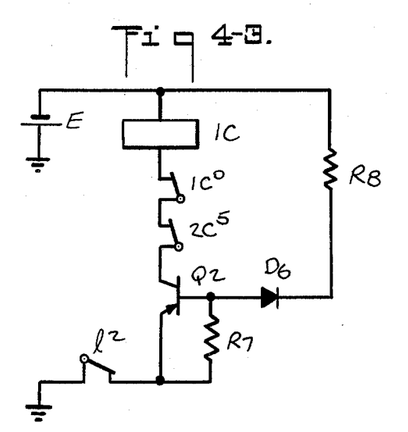
Figure 44:
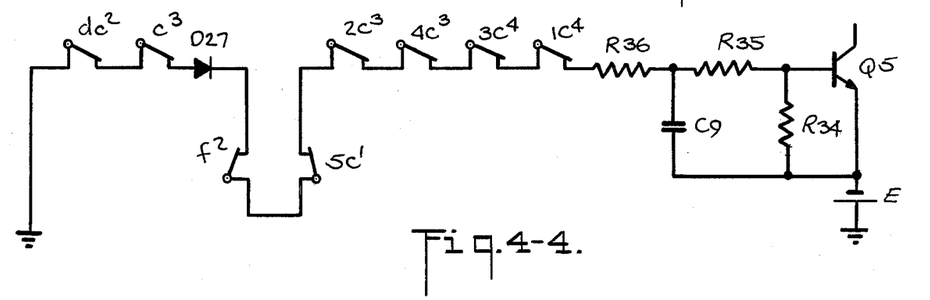

When the telephone set user raises the handset, the hookswitch closes so that relay A operates, and then relay L operates. When relay L operates, a ground is supplied to the counter circuit by its contact $l^2$ and preparation for counting dial pulses is completed. Since relay A releases once because of the bouncing of the hookswitch, the circuit shown in FIG. 4-1 is established. A ground is supplied to relay C and relay 1C thereby operating relay C and relay 1C. Simultaneously, the ground is also imparted to silicon controlled rectifier SCR1 according to the circuit shown in FIG. 4-2. The SCR1 is turned on because gate current flows to it. Thereafter, the gate current of SCR1 stops flowing because contact $1C^1$ is opened by the subsequent operation of relay 1C. However, since anode current greater than the holding current flows thru SCR1 and resistor R2, it continues conducting. Capacitor C2 is connected to prevent false triggering of SCR1.

After relay 1C has operated because of the first pulse, SCR1 prevents relay 2C from operating. That is, contact $1C^1$ applies ground to the emitter of transistor Q1, but since the emitter-base of Q1 is shorted by the conduction of SCR1, transistor Q1 does not conduct. Consequently the operation of relay 2C is prevented.

Thereafter, relay A operates and opens contact a. The ground supplied to the counter circuit II on lead DP is cut off, but since at this time the circuit of FIG. 4-3 is completed by means of contact $1C^\circ$, relay 1C remains operated. Transistor Q2 is conducting because it is supplied with base current via D6 and R8. When switching from the circuit of FIG. 4-1 to the circuit of FIG. 4-3 there is a possibility that relay 1C will oscillate if break contact $1C^1$ breaks before make contact $1C^\circ$ is closed, and it is to prevent this from happening that D4 is connected as shown. ($1C^\circ$ is a make-before-break contact, denoted by an "e" near the make contact). That is, since the operate time of relay 1C is longer than the turn-on time of SCR1, SCR1 will without fail turn on before the break contact of $1C^1$ opens. For this reason the ground passing through the circuit of FIG. 4-1 is supplied to the break side of the contact of $1C^\circ$ via SCR1 and D4, so that relay 1C will fully operate and does not oscillate. Relay C releases slowly due to discharge of the parallel resistor-capacitor circuit C1-R1, so that at the end of the C relay release delay period, starting with the operation of relay A and the opening of contact a, the circuit of FIG. 4-4 is completed by closure of break contact C3 and base current is supplied to transistor Q5. Because transistor Q5 starts conducting, the circuit of FIG. 4-5 is completed. The base current of transistor Q3 starts to flow when the circuit of FIG. 4-5 is completed.

Figure 45:
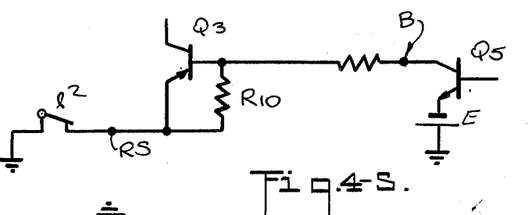
Figure 46:
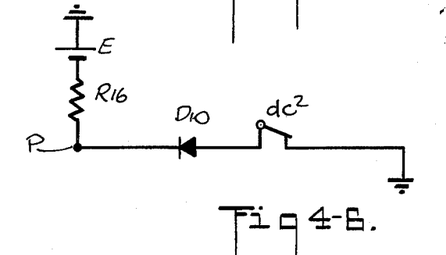
Figure 47:
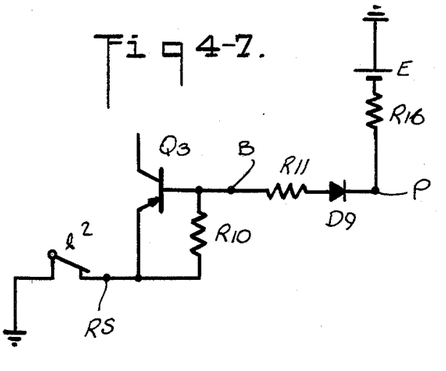
Figures 48, 410:
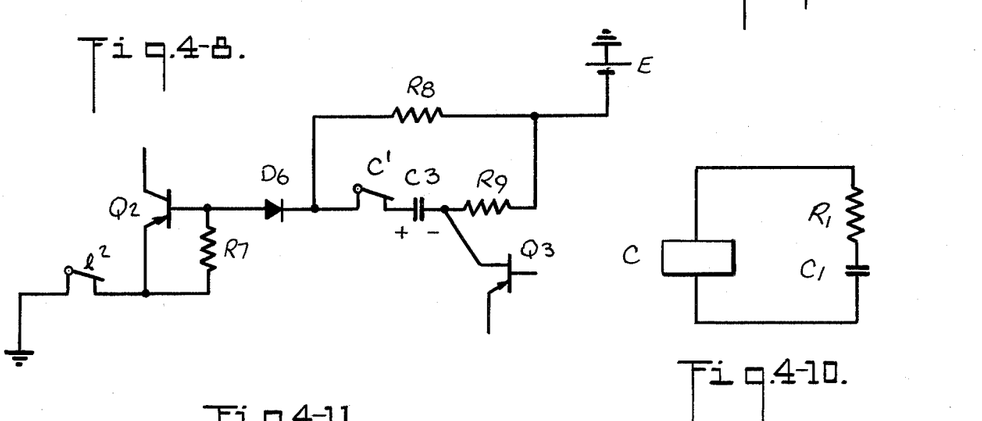
Figure 49:
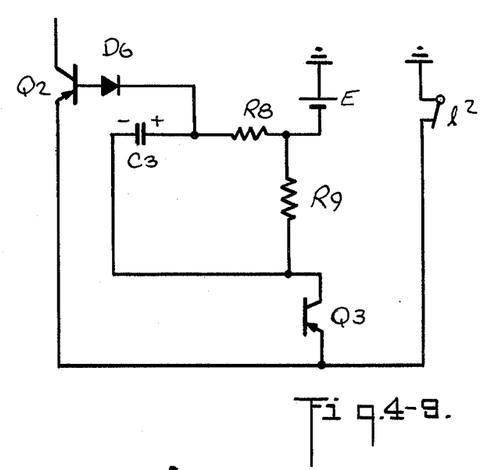
Figure 411:
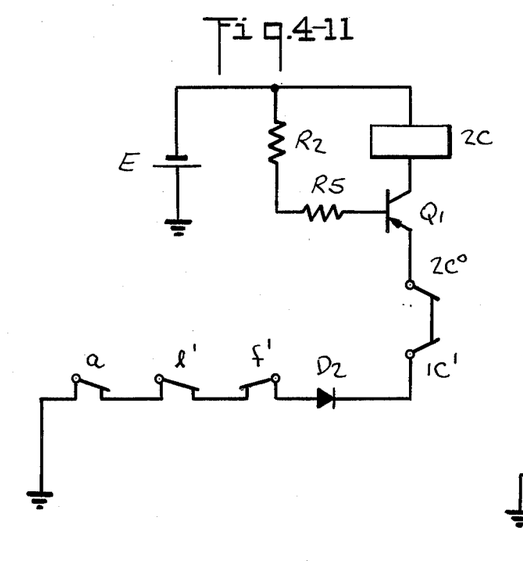
Figure 412:
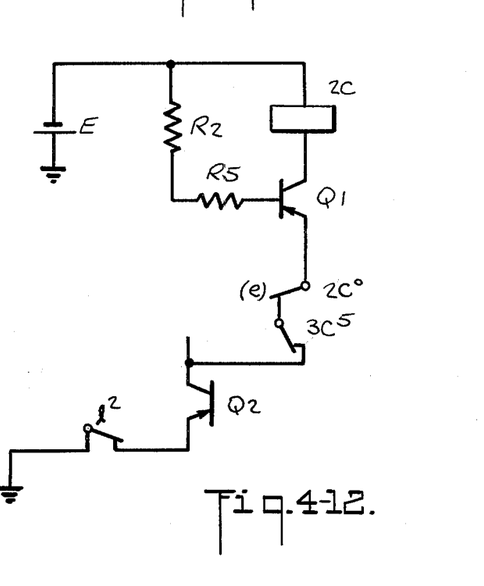
Figure 413:
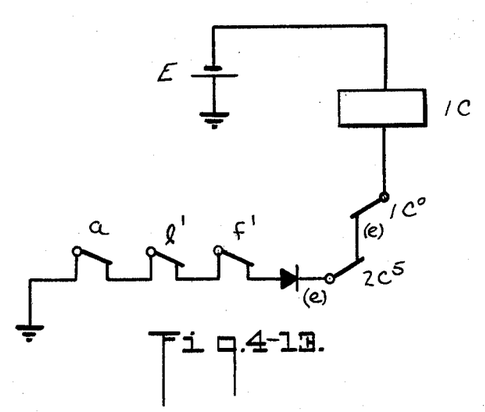
Figure 414:
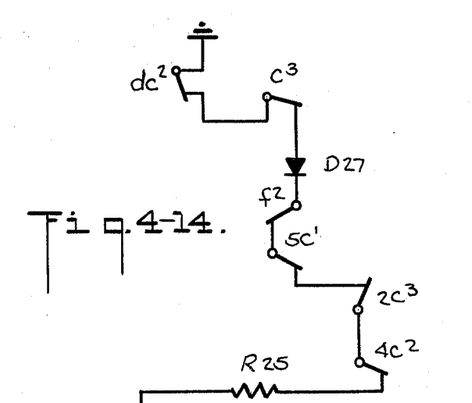
Figures 415, 416, 417, 418:
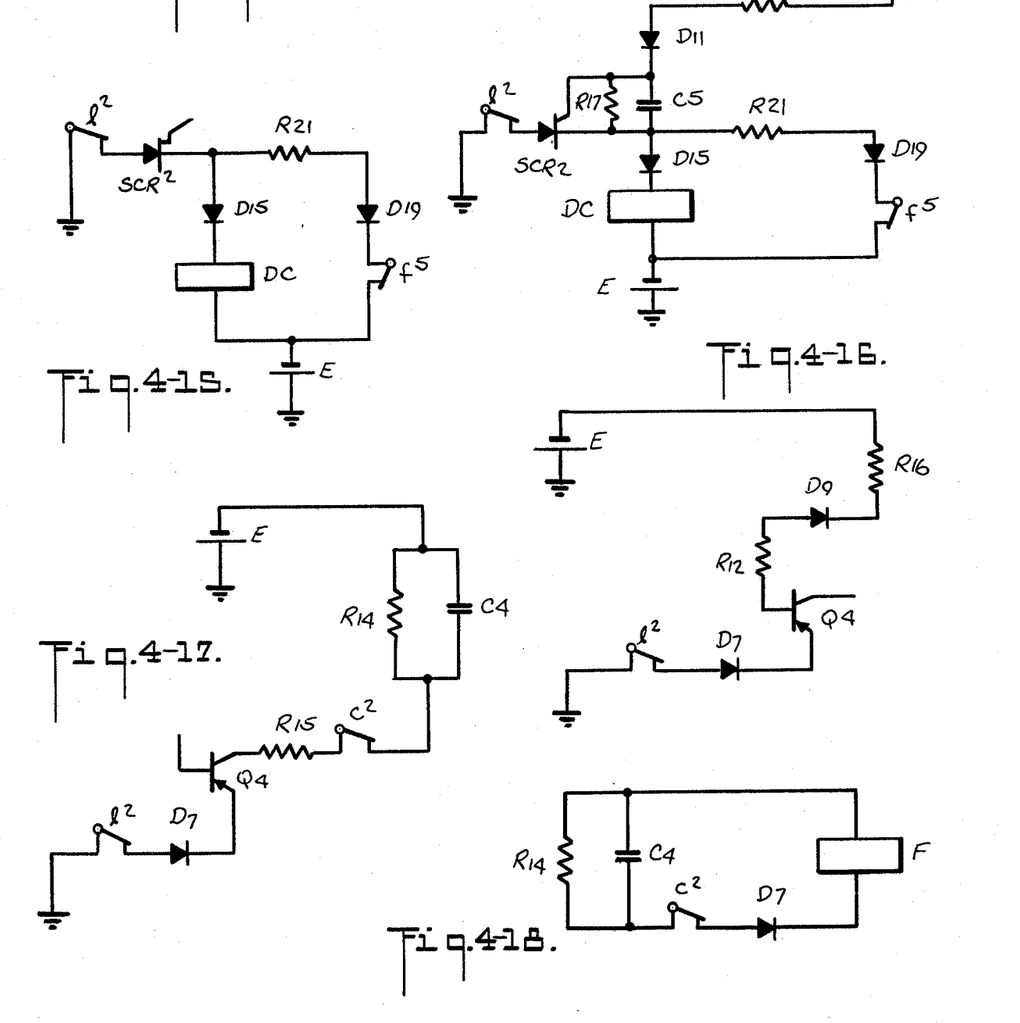

The reason that base current does not flow in Q3 before the circuit of FIG. 4-5 is established, is that the circuit of FIG. 4-6 effectively shunts the current to R16 around the FIG. 4-7 circuit of Q3, R11 and D9.

Thus, prior to the point when the circuit per FIG. 4-5 is established, when transistor Q3 is not conducting for the reasons given above, capacitor C3 is charged according to the circuit of FIG. 4-8 from ground via Q2, D6 to C3, and from C3 via R9 to the power source. When the circuit of FIG. 4-5 is completed transistor Q3 conducts, and as a result capacitor C3 starts to discharge via resistors R8 and R9 of the circuit of FIG. 4-9. Because of the discharge current of capacitor C3 through resistor R8 the base current of transistor Q2 is cut-off, transistor Q2 becomes nonconducting, the circuit of FIG. 4-3 is opened at Q2, and relay 1C releases. In order to insure the release of relay 1C without regard to the difference in the time between the opening of its make contact $1C^\circ$ and its make contact $1C^4$, capacitor C9 is connected as shown in the circuit of FIG. 4-4 and the cut-off of transistor Q5 is delayed long enough to keep Q3 on, Q2 off and for relay 1C make contact $1C^\circ$ to open.

By means of the above sequences, when a single pulse is received by the counter circuit, the counter circuit resets during the interdigital pause time after receipt of the single erroneous dial pulse and before the first valid pulse train begins.

In order to explain the functioning of the counter when more than a single pulse arrives in a first pulse train, two examples will be described to show how the circuit functions to count and store signals corresponding to pulse train inputs. The first example will be for the case when a telephone set user dials the number 21. This causes relay contact a to generate a first pulse train having two pulses and a second pulse train having one pulse. A second example will then be presented for the case when a telephone set user dials the number 30 where a first pulse train has three pulses followed by a second pulse train having ten pulses.

Example: User dials the number 21

When the telephone user dials the tens-position digit two, the dial pulses are input to the counter circuit via contact $a$ of relay A. and the counter circuit counts the number of pulses. In this case, relay A is released two times by operation of the dial and relay C and relay 1C operate according to the circuit of FIG. 4-1 during the initial release of relay A. As explained previously, SCR1 is gated via the circuit of FIG. 4-2, and the operation at this time of relay 2C thereby is prevented. When relay A reoperates a second time after its first release, the circuit of FIG. 4-1 is broken, but relay 1C remains operated because of the circuit of FIG. 4-3, and relay C remains operated by means of the discharge current of capacitor C1 of the circuit of FIG. 4-10 during the break time between the first dial pulse and the second dial pulse. SCR1 has its holding current cut off by the opening of relay A contact $a$ and turns off. Relay A subsequently releases again because of the second dial pulse, but this time relay 1C is operated and SCR1 is not conducting, so that transistor Q1 conducts, and relay 2C operates by means of the circuit of FIG. 4-11. Relay 2C is held operated in the same way that relay 1C is held operated after the first pulse has been applied to the circuit, by operation of its make-before-break contact $2C^\circ$. FIG. 4-12 shows the circuit which keeps relay 2C operated.

The operation of relay 2C also switches the holding ground circuit of relay 1C over to the circuit of FIG. 4-13 by means of transfer contact $2C^5$ of relay 2C. Consequently, when relay A is again reoperated at the end of the second dial pulse for the tens-position digit "2", relay 1C releases, and since the time period which passes until the next units-position digit dial pulse can be sent is greater than the interdigital pause time of the dial, relay C also releases. That is, the capacitance of C1 and the resistances of resistor R1 and relay coil C are selected so that the length of time that relay C remains operated because of the discharge of capacitor C1 of the circuit of FIG. 4-10 is greater than the make time between any two pulses of the dial pulse train and less than the minimum interdigital pause between dial pulls. When relay C releases while relay 2C is held operated, a trigger current flows in silicon controlled rectifier SCR2 by means of the circuit of FIG. 4-14. Silicon controlled rectifier SCR2, once triggered, is then held by means of the circuit of FIG. 4-15, and relay DC operates via diode D15. When relay DC operates, the outputs at terminals H, J, K and M are connected to power supply E by make contact $dc^1$ via the respective diodes as shown in FIG. 3 so that as long as relay DC does not release, additional SCR's in the group SCR2 to SCR5 will not conduct. SCR2 to SCR5 in FIG. 3 are connected in the circuit in order to record the tens-position digit of the first dial pulse train, SCR2 recording the tens-position digit 2, SCR3 recording the tens-position digit 3, SCR4 recording the tens-position digit 4, and SCR5 recording the tens-position digit 5. Capacitors C5, C6 and C7 and C8 are in the circuit to prevent false gating of SCR2, SCR3, SCR4 and SCR5 by noise transients. In the example presently being explained, when the number 21 is being dialed, the tens-position digit is 2, and SCR2 conducts. Further, because of the operation of relay DC the ground of the circuit shown in FIG. 4-6 a point "P" is cut off by break contact $dc^2$. As a result, transistor Q3 turns on because point "P" is no longer grounded as shown in the circuit of FIG. 4-7. Capacitor C3 discharges via the circuit of FIG. 4-9 with the result that transistor Q2 becomes cut off momentarily. Since the ground of the circuit of FIG. 4-12 is cut off at Q2, relay 2C releases. The opening of contact $dc^2$ also permits Q4 to turn on, since the $a$ contact is open at this point and D5 blocks.

Next when the telephone set user dials the units-position digit 1, relay A releases once. During the release time, relay C and relay 1C operate by means of the circuit of FIG. 4-1 as previously, and Q4 is turned off by the ground from diode D5. Because of the previous first dial pull for the tens-position digit, relay DC is already operated, its contact $dc^2$ is open, and the ground at point "P" of the circuit of FIG. 4-6 is already cut off. When relay contact $a$ again opens after the pulse, the circuit of FIG. 4-16 causes a base current to flow in transistor Q4, and current flows to capacitor C4 by means of the circuit of FIG. 4-17, charging C4. At this time relay 1C remains operated by means of the circuit of FIG. 4-3 and relay C has its release delayed by the circuit of FIG. 4-10. Next, relay C releases, capacitor C4 discharges by means of the circuit of FIG. 4-18 and relay F operates by means of the discharge current. When relay F operates, relay F self-holds by means of locking contact $f^\circ$ as shown in FIG. 4-19. Then the break side of $f5$ is opened (FIG. 3), ground is applied through contact $f^2$, silicon controlled rectifier SCR2, resistance R21 and resistance R29 and appears at the first dialing output 2, (lead N). Further, ground is applied through contact $f^2$, contact $f^2$, contacts $5C^1$, $2C^3$, $4C^3$, $3C^4$ and $1C^4$ and appears at the units-position output 1. Contact $f^1$ cuts off the pulse input to prevent the positions of the counter from being changed should extraneous additional digits be received. Thus by means of the above operations the counting of the number 21 is completed. Further, by means of an AND circuit for receiving the tens-position dialing output and the ones-position dialing output, a call circuit not shown in FIG. 1, FIG. 2 and FIG. 3 can be activated.

Example: User dials the number 30

Figures 419, 420, 421:
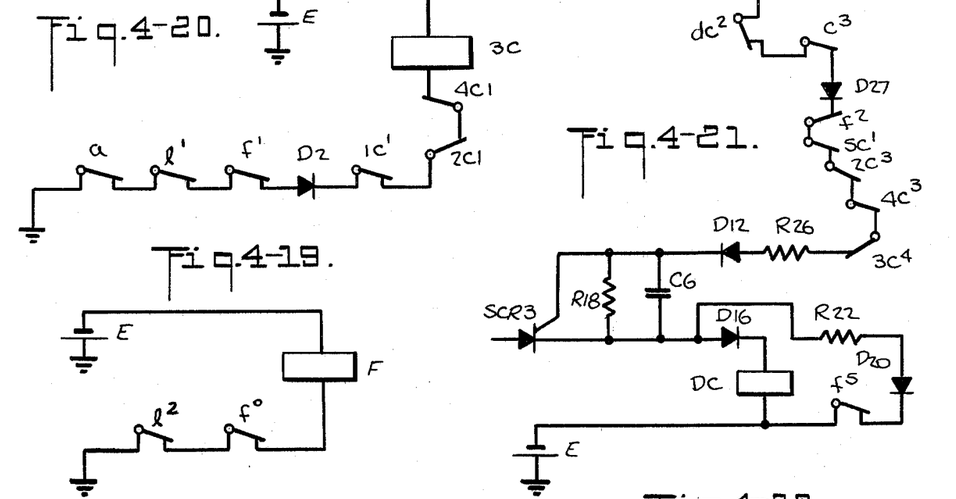
Figure 422:
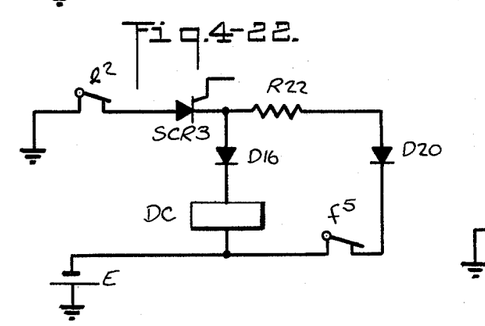

Counter circuit operation will be explained for the case when the user dials the number "30". The telephone set user first dials the tens-position digit 3, and relay A releases and reoperates three times and generates a train of three pulses. As previously described, by means of the first release of A, relay 1C and relay C operate; by means of the second release relay 2C operates; and by means of the second operation relay 1C is released. When relay A again releases the third time, since relay 2C is already operated at this time and relay 1C is released, relay 3C operates according to the circuit of FIG. 4-20 and relay 3C locks by means of make-before-break contact $3C^\circ$. On the other hand, the holding circuit of relay 2C is transferred by $3C^5$, and relay 2C releases by the reoperation of relay A. Relay C releases after its delay period and a trigger current flows to silicon controlled rectifier SCR3 in accordance with the circuit of FIG. 4-21. Anode current flows in SCR3 according to the circuit of FIG. 4-22. Silicon controlled rectifier SCR3 remains on, and relay DC operates. Thereafter, by the same circuit operation as when the tens-position digit 2 was dialed as described before, transistor Q2 becomes nonconducting, and relay 3C releases.

Figure 423:
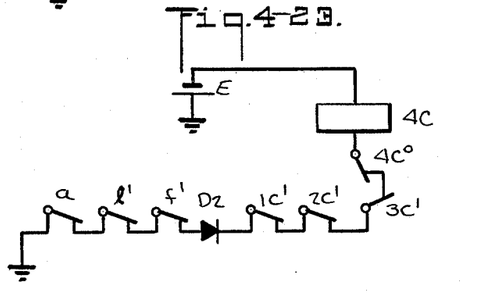

Next, counter circuit operation will be explained for the case when the units-position digit zero for the number 30 is dialed. By means of the second dial pull of the telephone set, relay A releases and operates ten times. During the first release, relay C and relay 1C operate in the same manner as for the previously described case. The second release of A causes relay 2C to operate, and the second operation causes relay 1C to release. Then the third release causes relay 3C to operate, and the third operation causes relay 2C to release. Then in the same way the fourth release of relay A completes the circuit of FIG. 4-23 wherein relay 4C operates. The fourth operation of relay A causes relay 3C to release. When relay 3C releases, the operation of the counter circuit because of the releasing of relay A the fifth and sixth times is the same as the operation of the counter circuit because of the releasing of relay A the first and second times, with the exception of the fact that relay 4C remains operated.

Figure 424:
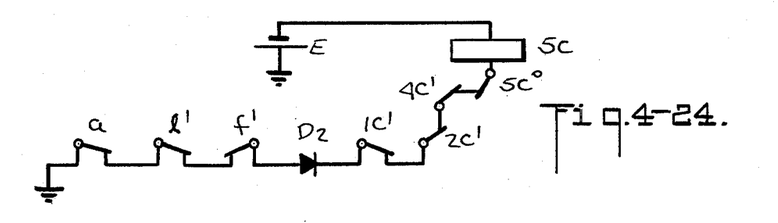
Figure 425:
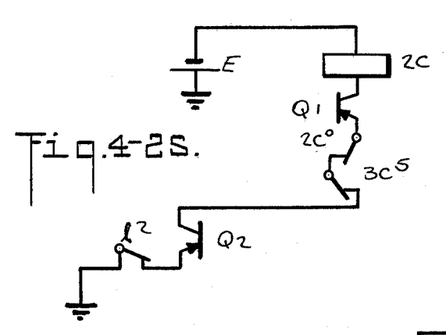
Figure 426:
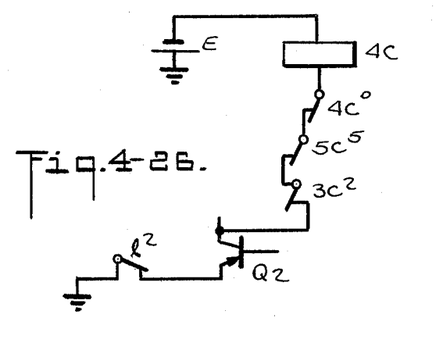

The fifth release of relay A causes relay 1C to operate, the sixth release causes relay 2C to operate. Relay 1C releases upon the sixth operation of relay A. When relay A releases for the seventh time, since relay 2C and relay 4C are operated at this time, relay 5C operates according to the circuit of FIG. 4-24 and relay 5C locks operated by means of its make-before-break contact 5C°. On the other hand, relay 4C which has been operated until now has its holding ground circuit switched over to the dial pulse output at contact $a$ by contact 5C$^5$, so that it releases upon the seventh operation of relay A. However, since relay 3C is not operated, the holding ground of relay 2C is not broken and relay 2C remains operated even after the seventh operation of relay A by means of the circuit shown in FIG. 4-25. From this state, that is, the state where relay 5C and relay 2C are operated, when relay A releases for the eighth time, relay 3C operates by means of the circuit of FIG. 4-20, and relay 3C holds by means of contact 3C°. The operation of relay 3C transfers the holding ground for relay 2C over to the A relay dial pulse output by means of contact 3C$^5$, and consequently relay 2C releases upon the operation of relay A for the eighth time.

The ninth release of relay A causes relay 4C to operate by means of the circuit of FIG. 4-23 and relay 4C locks by means of the circuit of FIG. 4-26. However, since at this time the holding ground circuit of relay 3C is switched over to the dial pulse contact of relay A by means of contact 4C$^5$, the ninth operation of relay A causes relay 3C to release, and since the circuit of FIG. 4-26 is broken, relay 4C also releases. Consequently after the ninth operation of relay A, only relay 5C remains operated. Further, the tenth release of relay A causes relay 1C to operate by means of the circuit of FIG. 4-1, and it holds by means of the circuit of FIG. 4-3. After this, relay A reoperates, and after the delay period, relay C releases, and by means of the same circuit operation described for the case when the number 21 was dialed, relay F operates. As a result, the ground passes through contact $f^2$, silicon controlled rectifier SCR3, resistor R22 and resistor R30 and appears at tens-position digit output 3. Further, the ground passes through contact $f^2$, contact $f^2$, make contact 5C$^1$, break contact 2C$^2$, break contact 3C$^3$ and make contact 1C$^2$ and appears at units position digit output zero. Then, by means of contact $f^1$, the counter circuit input is cut off to prevent any erroneous additional digits from changing the count. Thus electrical signals corresponding to the number 30 appear at the output of the counter circuit.

Table 1 which follows shows which SCR3 conducts for first dial pulses trains corresponding to the tens-position digits 2, 3, 4 and 5. Table 2 shows the relays which operate for a dial trains corresponding to the units-position digits 1–0.

Table 1.

| Tens-Position Pulses | Conducting SCR |
|---|---|
| 2 pulses | SCR2 |
| 3 pulses | SCR3 |
| 4 pulses | SCR4 |
| 5 pulses | SCR5 |

Table 2.

| Counting Relay: | Relay 1C | Relay 2C | Relay 3C | Relay 4C | Relay 5C |
|---|---|---|---|---|---|
| Units-Position Pulses | | | | | |
| 1 pulse | X | | | | |
| 2 pulses | | X | | | |
| 3 pulses | | | X | | |
| 4 pulses | | | | X | |
| 5 pulses | X | | | X | |
| 6 pulses | | X | | X | |
| 7 pulses | | X | | | X |
| 8 pulses | | | X | | X |
| 9 pulses | | | | | X |
| 10 pulses | X | | | | X |

Note: X denotes relay operated

It can readily be seen that the circuit shown in FIGS. 1–3 will generate electrical output signals corresponding to numbers from 20 to 50, a result particularly useful in a key telephone signalling system having up to 40 station sets. The preferred circuit which has been described does not respond to a single pulse entering a quiescent counter. It will be obvious to those skilled in the art how to modify the circuit so it will not respond to 2, 3 ... $n$ ($n<7$) pulses appearing in a first pulse train, while nevertheless counting the $(n + 1)$, $n+2$ ... 10 pulses in pulse trains for the tens-position digit and then counting pulses from 1 to 10 for the units-position digit.

What is claimed is:

1. In a key telephone system, pulse counting apparatus for counting the pulses in each of two sequentially applied pulse trains, each pulse train having at most ten pulses, said apparatus comprising relay counting means responsive to each of said applied pulse trains for energizing a particular combination of relays, the particular combination of energized relays corresponding to the number of pulses in each pulse train, relay contacts associated with said relays being arranged to generate a signal on only one of a plurality of leads, each of the leads corresponding to one number of the number of pulses in a pulse train, memory circuit means, responsive to the particular signal on one of said plurality of leads corresponding to the number of pulses counted for the first pulse train, for enabling a particular storage element corresponding to the number of pulses in said first pulse train, resetting means for resetting said relay counting circuit means to zero count if the first pulse train applied to the counting apparatus contains only one pulse, the resetting means having a first relay, part of said relay counting circuit means, energized by a first electrical circuit means in response to a first pulse in a first pulse train, a second relay, also part of said relay counting circuit means, energized by a second electrical circuit means in response to a first pulse in a first pulse train, a first relay contact associated with said second relay being closed when said second relay is energized, a second relay contact associated with said second relay for connecting the coil of said second relay to a third electrical circuit thereby maintaining energized said second relay, the coil of said second relay being placed in series with the collector-emitter path of a transistor in said third electrical circuit, a first relay contact associated with said first relay, said first relay contact being open during the time said first relay is energized, said first relay contact being closed after the last pulse in a pulse train has ended, the closing of said relay contact being delayed until after said pulse train has ended by means of a series resistor and capacitor being placed in parallel with said first relay, the values of the resistance of said resistor and the capacitance of said capacitor being selected such that the resistance-capacitance product is a time constant shorter than the interdigital pause between pulse trains but longer than the break time between pulses in a pulse train, a fourth electrical circuit means in series with said first relay contact associated with said second relay created by the closing of said first relay contact associated with said first relay for generating a control signal and applying said control signal to the base of said transistor thereby cutting off said collector-emitter path of said transistor and returning said second relay to a released state, circuit means responsive to said relay counting means and said memory circuit means for generating a final signal when two pulse trains have been received and counted, circuit means responsive to said final signal for applying one first output signal from said memory circuit means onto a particular tens-position signal lead there being only one tens-position signal lead corresponding to each of the possible number of pulses in said first pulse train, and simultaneously applying one second output signal on one of said plurality of leads, the particular lead on which the second output signal is applied corresponding to the number of pulses in the second pulse train.

2. The apparatus of claim 1 wherein said memory circuit means comprises a plurality of silicon controlled rectifiers, one silicon controlled rectifier being applied for each of the individual numbers of pulses in said first pulse train.

* * * * *